J. L. DONAT.
WHEEL TIRE.
APPLICATION FILED NOV. 2, 1914.
1,162,143. Patented Nov. 30, 1915.
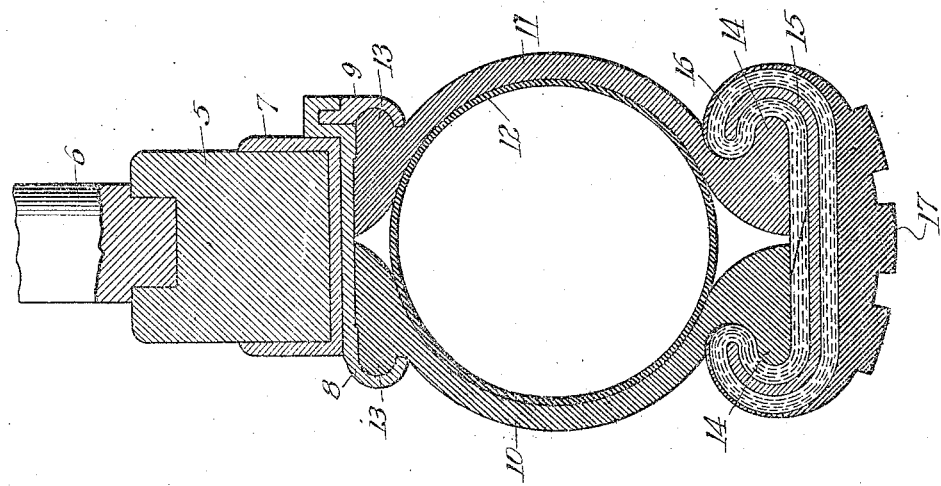
Witnesses:
Inventor
Joseph L. Donat

UNITED STATES PATENT OFFICE.

JOSEPH L. DONAT, OF CHICAGO, ILLINOIS.

WHEEL-TIRE.

1,162,143.

Specification of Letters Patent.   Patented Nov. 30, 1915.

Application filed November 2, 1914.   Serial No. 869,853.

*To all whom it may concern:*

Be it known that I, JOSEPH L. DONAT, a citizen of the United States, residing at Chicago, in the county of Cook and State of Illinois, have invented certain new and useful Improvements in Wheel-Tires, of which the following is a specification.

My invention relates to vehicle wheels.

One of the objects of my invention is to improve the tires of such wheels.

A more specific object of my invention is to increase the durability of such structures; to render them punctureless; to simplify the construction; to provide a larger air bearing surface; to decrease the molecular disintegration of the fibrous casing due to acute constant flexing of the fabric and to render the structure more conveniently and easily to be assembled.

Other and further objects of my invention will become readily apparent to persons skilled in the art from a consideration of the following description when taken in conjunction with the drawings, wherein the drawing shows a transverse section through a part of the spoke, the felly and the tire of my improved wheel.

Only fragmentary portions of the wheel structure are shown, the felly 5, spoke 6 and channel rim 7. The tire rim 8, of the usual form is adapted to slip over the channel rim 7 and is provided with a movable part 9. A two part casing 10 and 11 surrounds the inner air tube 12. The casing members are each provided with annularly extending clencher projections 13 and 14 which may be continuous or located at intervals.

15 is a metal rim encompassed by a rubber fabric 16, having a rubber tread 17. The rubber and fabric are incorporated, the one with the other, and the steel or iron rim 15 may be inclosed in this material, which may be vulcanized thereon. By this means the casing members 10 and 11 are protected from actual contact with the metal rim 15 and a more yielding and elastic connection is effected, between the rigid metal tire and the casing members.

To disassemble the structure, or to remove the inner tube 12, it is only necessary to take away the ring 9 when the casing member 11 may be easily slipped out from the fastenings, after which the casing member 10 may be easily removed, in the same manner. Should a blow-out occur in either of the casing members 10 and 11, a new member may be substituted without the necessity of removing the companion member, thereby saving half the cost in the casing. As the iron ring 15 and the tread 17 are circumferentially continuous and relatively strong a larger bearing surface on the inclosed cushion of air, within the tube 12 is obtained, and therefore less pressure per square inch within the inner tube 12 is necessary.

When the parts have been assembled, in a manner described, the air pressure within the inner tube 12 will hold the annular projections 13 and 14 or other such fastenings in intimate contact with the overlying portions containing the grooves within which said projections lie.

Having described my invention, what I claim is:—

The combination with a rubber tread member for a circumferentially divided tire casing of a metal clencher ring and a fabric cover entirely incasing said ring and vulcanized to the rubber tread, said rubber tread member covering the fabric ring cover except on the inner portion thereof engaged by the tire casing.

In testimony whereof I hereunto set my hand in the presence of two subscribing witnesses.

JOSEPH L. DONAT.

In the presence of—
 FORÉE BAIN,
 MARY F. ALLEN.